Sheet №.1.
2 Sheets.
S. G. Randall.
Harvester Rake.
№ 15387
Fig. 1.     Patented Jul. 22, 1856.
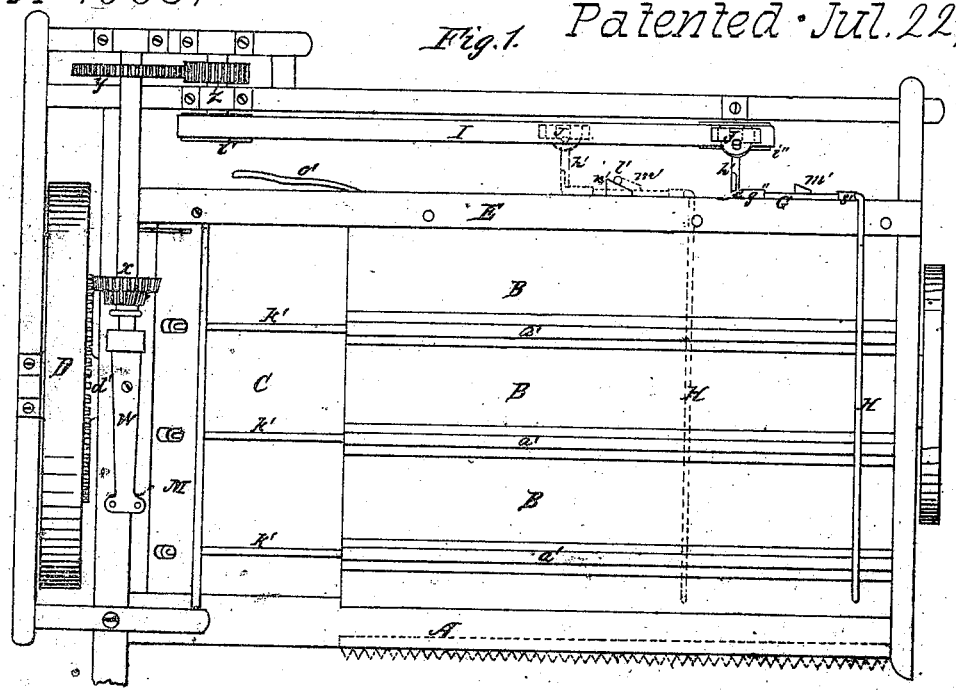
Fig. 2.
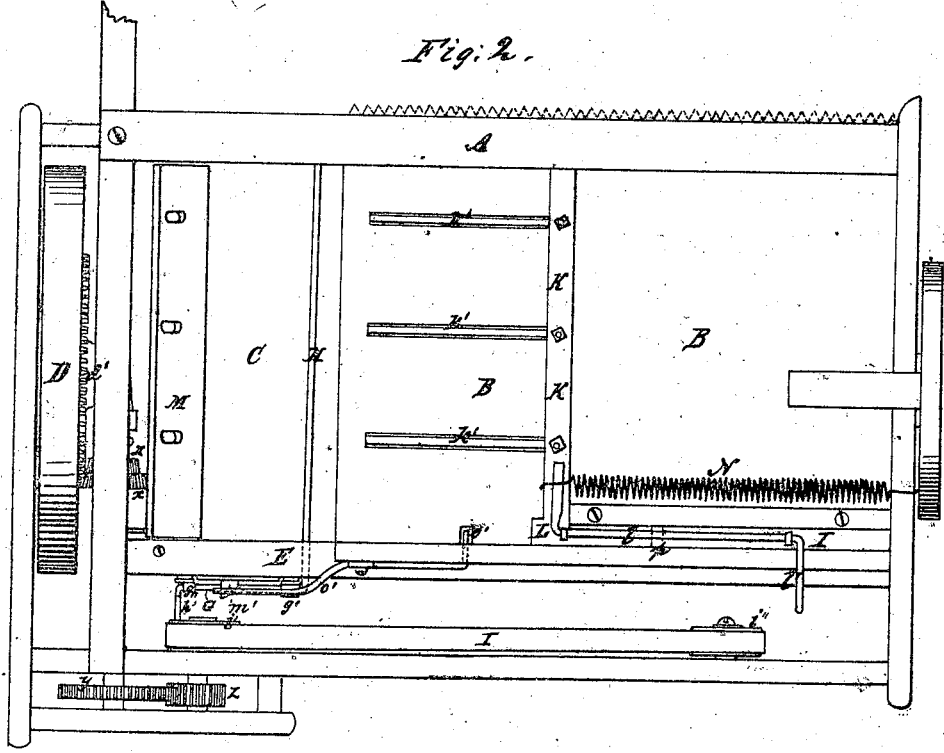

Sheet N° 2.
2 Sheets.

S. G. Randall.
Harvester Rake.

N° 15387     Patented Jul. 22, 1856.

UNITED STATES PATENT OFFICE.

SILAS G. RANDALL, OF ROCKFORD, ILLINOIS.

IMPROVED SELF-RAKER FOR HARVESTERS.

Specification forming part of Letters Patent No. 15,387, dated July 22, 1856.

*To all whom it may concern:*

Be it known that I, SILAS G. RANDALL, of Rockford, county of Winnebago, State of Illinois, have invented certain new and useful Improvements in Automatic Raking Attachments for Harvesters, of which the following is a full, clear, and sufficient description, reference being had to the accompanying drawings, making part of the same.

Figure 3:
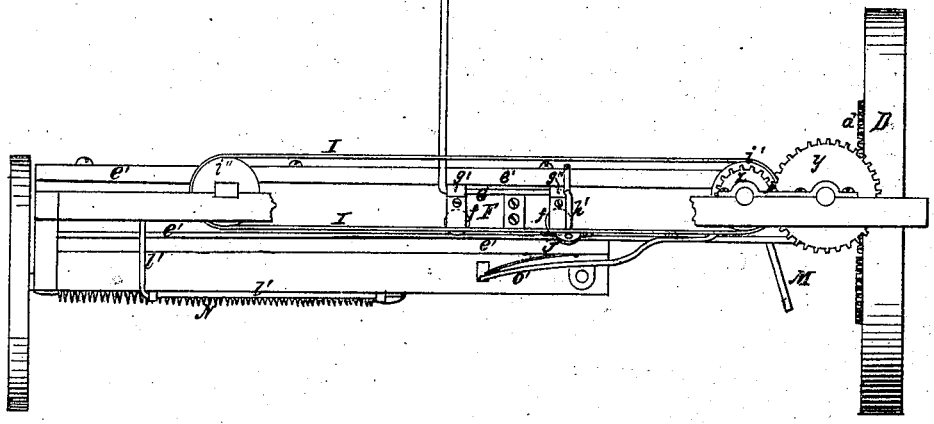
Figure 4:
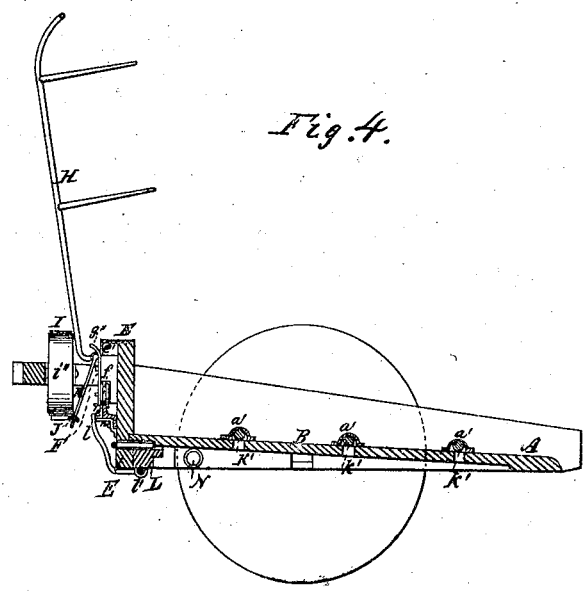

Figure 1 is a plan view of my machine, representing the rake in position to commence action, the spring-bottom as extended, together with the corresponding position of the rake, being shown in dotted lines. Fig. 2 is a view of the same from beneath, the spring-bottom having been just released. Fig. 3 is a rear view of the railway, endless belt, and parts connected therewith, the rake being elevated, as in its return motion. Fig. 4 is a cross-section of the platform, showing the metal ridges which form sheaths for the rods of the spring-bottom, and also the bent guide-strips that form ways for the carriage.

The general construction of the machine needs no especial description here, it being shown in the drawings sufficiently for the present purpose.

The cutting apparatus is extended along the cutter-bar A the length of the platform B to the gavel-space C, being operated in any suitable manner from the driving-wheel D.

To the upper and lower edges of the back piece, E, are attached metal strips $e'$, bent as shown, to form ways upon which run the grooved friction-wheels $f' f'$ (shown in dotted lines in Fig. 3) of the carriage F. Upon this carriage are eyes $g' g''$, bearing the shaft G of the rake H, the eye $g''$ being provided with a projection against which the rake-arm $h'$ comes in contact, and which thus prevents the rake from falling below the platform when it traverses beyond it.

A gear, $d'$, on the face of the wheel D communicates its motion through one of the pinions $x$, the cog-wheel $y$, and the pinion $z$ to the roller $i'$, which, in connection with the roller $i''$, carries a belt, I, upon which is an eye, J, which receives the rake-arm $h'$, and thus gives motion to the rake H and its carriage F.

It will readily be seen that when the eye J, following the belt, descends around the roller $i'$ it depresses the rake-arm and elevates the rake to a right angle with the platform, in which position it remains during the passage of the eye along the lower tangent of the rollers and the consequent return of the rake to the grain end of the platform. The rake in like manner descends when the eye J ascends the roller $i''$, and rakes over the platform during the passage of the said eye along the upper tangent of the rollers.

Upon the platform are three or four metal ridges, $a' a' a'$, which serve the double purpose of raising the grain sufficiently to secure the better action of the rake-teeth upon it and of providing sheaths for the slide-rods $k'$, which compose the spring-bottom, and which are thus brought on a level with the platform. These rods are attached to a head, K, carried by a slide, L, both being beneath the platform, as shown in Fig. 2. This slide L is provided with a bent spring-lever, $l'$, against which the projection $m'$ on the carriage F takes at the beginning of its traverse, and by which the slide and its head K and rods $k'$ are thus, as the rake advances, pushed out over the gavel-space C until the incline $n'$ raises the upper arm of the lever $l'$ sufficiently for the projection $m'$ to pass beneath it, the spring-bottom being simultaneously fixed in position by the taking of the spring-catch $o'$ into a notch, $p'$, in the slide L. The rake continues to advance until at the extreme of its traverse it has compressed the grain upon the rods $k'$ against the spring-pressing guard M into holes in which the said rods have entered. At this point the projection $m'$ passes over the upper end of the spring-catch $o'$ and raises its lower end out of the notch $p'$, when the spring N instantly retracts the head K and rods $k'$, and the compressed grain is deposited in a gavel upon the ground just inside the driving-wheel.

It is manifest that the relative velocity of the rake, and consequently the size of the gavels, can be regulated by bringing into gear with the teeth on the face of the driving-wheel different-sized pinions $x x$, which are, for that purpose, rendered capable of longitudinal adjustment on their shaft, the inner journal of which is attached to the lever $w$, so that by moving said lever either pinion can be thrown into or out of gear.

I am aware that traverse-rakes similar to mine have been used, where said rake is elevated at the end of its action for the return; but I am not aware that it has before been mounted on a railway-carriage, or that it has before received its traverse and tilting motions at once from so simple a device as in my machine.

I am also aware that a part of the platform of a reaper has been constructed of sliding rods, which, having received the grain partially from the cutters themselves and partially from the rake, are drawn back and deposit the said grain on the ground, at the same time permitting the falling grain to drop and be scattered along on the ground until said rods are again extended; but I am not aware that these rods have ever been used as a spring-bottom extending beyond the platform and the cutters or in connection with the pressing-guard.

Having thus described my raking attachment and set forth the mode of its operation, what I claim therein as new and of my own invention, and desire to secure by Letters Patent, is—

1. The railway-carriage F, when constructed, arranged, and operated in respect to the platform B substantially as and for the purpose above set forth and described.

2. The above-described method of operating the rake H and giving it at once its traverse and its tilting actions—viz., by the combination, with the bent rake-shaft G and arm $h'$, of the endless belt I and its eye J, operating as and for the purpose above set forth.

3. The combination of the traverse-rake H, the spring-rods $k'$, and the pressing-guard M, substantially as and for the purpose above set forth and described.

In testimony whereof I have hereunto subscribed my name.

SILAS G. RANDALL.

In presence of—
EPHRAIM ROBBINS,
WM. M. HOWLAND.